US008851677B2

(12) United States Patent
Liebich et al.

(10) Patent No.: US 8,851,677 B2
(45) Date of Patent: Oct. 7, 2014

(54) ARRANGEMENT WITH A SPECTACLE LENS HAVING A CHANGEABLE EFFECT AND METHOD FOR SETTING THE EFFECT OF A SPECTACLE LENS

(75) Inventors: Simone Liebich, Aalen (DE); Gerhard Kelch, Aalen (DE)

(73) Assignee: Carl Zeiss Vision GmbH, Aalen (DE)

( * ) Notice: Subject to any disclaimer, the term of this patent is extended or adjusted under 35 U.S.C. 154(b) by 372 days.

(21) Appl. No.: 13/331,559

(22) Filed: Dec. 20, 2011

(65) Prior Publication Data

US 2012/0154750 A1 Jun. 21, 2012

(30) Foreign Application Priority Data

Dec. 20, 2010 (DE) .................. 10 2010 055 185

(51) Int. Cl.
*A61B 3/10* (2006.01)
*G02C 7/08* (2006.01)
(52) U.S. Cl.
CPC . *G02C 7/08* (2013.01); *G02C 7/083* (2013.01)
USPC .......................................... 351/221; 351/246
(58) Field of Classification Search
USPC .................. 351/200, 205, 206, 221, 246, 351/159.72–159.75
See application file for complete search history.

(56) References Cited

U.S. PATENT DOCUMENTS

| 4,181,408 | A | 1/1980 | Senders |
| 4,300,818 | A | 11/1981 | Schachar |
| 5,182,585 | A | 1/1993 | Stoner |
| 5,712,721 | A | 1/1998 | Large |
| 6,244,703 | B1 | 6/2001 | Resnikoff et al. |
| 6,491,394 | B1 | 12/2002 | Blum et al. |
| 6,638,304 | B2 | 10/2003 | Azar |
| 7,041,133 | B1 | 5/2006 | Azar |
| 7,131,725 | B2 | 11/2006 | Walh et al. |
| 7,486,988 | B2 | 2/2009 | Goodall et al. |
| 7,527,375 | B2 | 5/2009 | Blum et al. |

(Continued)

FOREIGN PATENT DOCUMENTS

| DE | 102 39 689 A1 | 3/2004 |
| EP | 0 341 519 A2 | 11/1989 |

(Continued)

OTHER PUBLICATIONS

English translation of the search report of the European Patent Office dated May 2, 2012 in the corresponding European patent application.

(Continued)

*Primary Examiner* — James Greece
(74) *Attorney, Agent, or Firm* — Walter Ottesen P.A.

(57) ABSTRACT

The invention relates to an arrangement with a spectacle lens having a changeable optical effect and with an effect-setting apparatus for setting the optical effect of the spectacle lens on the basis of intended-setting data. A memory apparatus stores first intended-setting data for setting a first predetermined optical intended effect, which was established from a first refraction measurement on an eye of a spectacles wearer for whom the spectacle lens is destined, and for storing second intended-setting data for setting a second predetermined optical intended effect, which was established from a second refraction measurement on the eye, and also a supply apparatus for supplying the first intended-setting data or the second intended-setting data to the effect-setting apparatus.

12 Claims, 3 Drawing Sheets

(56) References Cited

U.S. PATENT DOCUMENTS

| | | | |
|---|---|---|---|
| 7,744,217 B2 | 6/2010 | Cabeza et al. | |
| 7,771,052 B2 | 8/2010 | Kratzer et al. | |
| 7,936,496 B2 | 5/2011 | Kosa et al. | |
| 7,971,994 B2 | 7/2011 | Blum et al. | |
| 8,016,415 B2 | 9/2011 | Figler et al. | |
| 8,038,296 B2 | 10/2011 | Baumann et al. | |
| 2003/0018383 A1 | 1/2003 | Azar | |
| 2004/0120035 A1 | 6/2004 | Hoffmann | |
| 2005/0036109 A1 | 2/2005 | Blum et al. | |
| 2006/0012747 A1 | 1/2006 | Wahl et al. | |
| 2007/0216864 A1* | 9/2007 | Blum et al. | 351/176 |
| 2007/0280626 A1 | 12/2007 | Haddock et al. | |
| 2007/0290972 A1 | 12/2007 | Meredith | |
| 2007/0296918 A1 | 12/2007 | Blum et al. | |
| 2008/0100792 A1 | 5/2008 | Blum et al. | |
| 2008/0106694 A1 | 5/2008 | Blum et al. | |
| 2008/0106695 A1 | 5/2008 | Kokonaski et al. | |
| 2008/0180630 A1 | 7/2008 | Clarke et al. | |
| 2008/0212007 A1 | 9/2008 | Meredith | |
| 2008/0212025 A1 | 9/2008 | Baumann et al. | |
| 2008/0218689 A1 | 9/2008 | Blum et al. | |
| 2009/0015787 A1 | 1/2009 | Guillen et al. | |
| 2009/0115961 A1 | 5/2009 | Blum et al. | |
| 2010/0198817 A1 | 8/2010 | Esser et al. | |
| 2011/0228212 A1 | 9/2011 | Blum et al. | |

FOREIGN PATENT DOCUMENTS

| | | | |
|---|---|---|---|
| FR | 2 530 039 A1 | 1/1984 |
| WO | WO 2005/057252 A2 | 6/2005 |
| WO | WO 2007/146265 A2 | 12/2007 |

OTHER PUBLICATIONS

Nio et al, "Spherical and irregular aberrations are important for the optimal performance of the human eye", Ophthal. Physiol.Opt., 2002, 22, No. 2, pp. 103-112.

English translation of office action of the German Patent Office dated Jun. 16, 2011 in the parallel German patent application 10 2010 055 185.6.

* cited by examiner

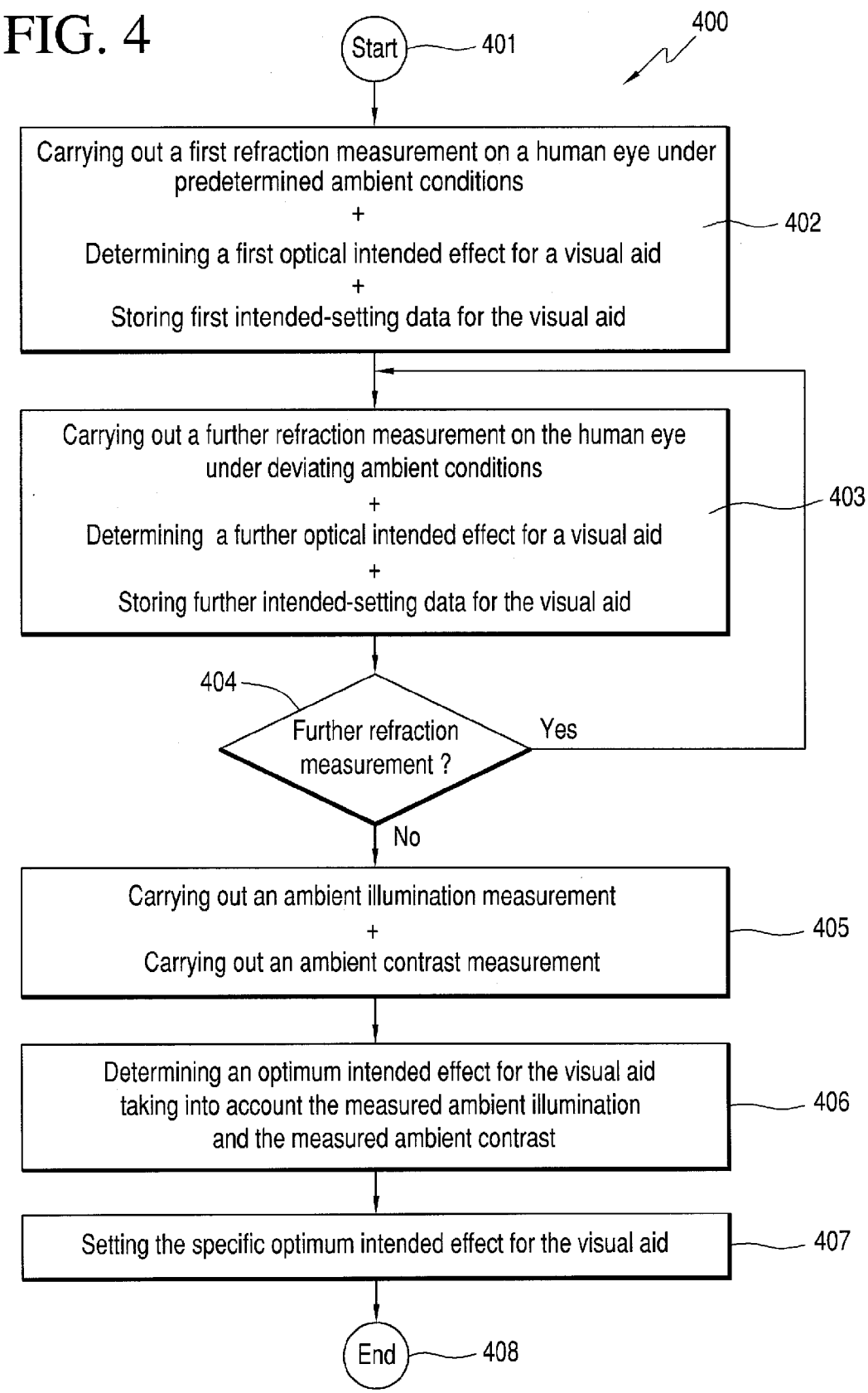

ately simple method for setting an adaptive spectacle lens, which takes into account the sensitivity of the visual power with respect to different ambient conditions, more particularly with respect to the ambient illumination and the contrast.

ARRANGEMENT WITH A SPECTACLE LENS HAVING A CHANGEABLE EFFECT AND METHOD FOR SETTING THE EFFECT OF A SPECTACLE LENS

CROSS REFERENCE TO RELATED APPLICATION

This application claims priority of German patent application no. 10 2010 05.6, filed Dec. 20, 2010, the entire content of which is incorporated herein by reference.

FIELD OF THE INVENTION

The invention relates to an arrangement with a spectacle lens having a changeable effect and a method for setting the effect of a spectacle lens having a changeable effect.

BACKGROUND OF THE INVENTION

The fact that the visual performance of a human eye depends on the ambient conditions is known. In particular, both the ambient illumination and the contrast of the observed object influence the visual performance. As an example for the influence of the ambient illumination, the phenomenon of night myopia, that is, shortsightedness under mydriatic conditions, is mentioned. The contrast sensitivity in turn depends on the spatial frequency of the observed object. Thus, for example, FIG. 2 in U.S. Pat. No. 7,771,052 shows a typical profile of the contrast sensitivity over the spatial frequency, specified in cycles per degree (cpd).

What is common to both phenomena is that they influence the visual performance of different persons in different ways. That is to say each individual has different sensitivity toward the ambient illumination and the contrast.

Instruments and methods have been developed very recently which allow the refraction of the eye to be established individually, taking into account different ambient conditions. Thus, for example, Carl Zeiss Vision GmbH has under the name iProfiler made commercially available a measuring instrument for determining the objective refraction; this calculates prescriptions according to the so-called iScription method. The latter method takes into account different ambient conditions when calculating the refraction values for the spectacles prescribed to the ametropic person. United States patent application publication 2010/0198817 A1 teaches the establishment of a subjective refraction and a plurality of objective refractions for a multiplicity of different boundary conditions, such as brightness, contrast, et cetera. An effective objective refraction is then determined from the plurality of objective refractions. The effective objective refraction is then compared to the objective refraction and the deviations are determined. The intended values for the spectacle glass are then determined from the effective objective and the subjective refraction.

In both cases, the prescribed effect of the spectacles is calculated from a—possibly also weighted—averaging over different conditions. It therefore constitutes a better or not so good compromise.

The prior art has also disclosed so-called electro-active elements. United States patent application publication 2008/0180630 A1 describes an element that can, for example, be switched between a first optical effect and a second optical effect. In order to produce the first optical effect, the element is in a deactivated state, that is, the voltage(s) applied to the electrodes is (are) below a threshold. In order to produce the second optical effect, the element is in an activated state, that is, the voltage(s) applied to the electrodes is (are) above a threshold. The optical effect of the electro-active element can also be embodied in a "tunable" fashion.

Furthermore, this document describes an electro-active lens for correcting presbyopia. The near part and optionally the progressive part of the lens are configured to allow the electro-active effect to be switched in order to correct the missing or adversely affected accommodation ability of the eye when required.

United States patent application publication 2007/0280626 A1 and WO 2008/002388 A2 describe electro-active lenses that are equipped with a distance sensor in order to be able to adapt the refractive power of the lens automatically to different object distances.

For ophthalmological applications, the refractive power of the above-described electro-active lenses is set purely in respect of the desired object distance(s). No other parameters are considered.

DE 102 39 689 A1 describes a spectacles arrangement with an adaptive lens, in which radiation reflected by the eye is detected and the refractive effect of the lens is modified locally depending on the detection signal. This results in adaptive spectacles, which undertake the adaptation for the object observed by the eye and, in doing so, at the same time correct possible refractive errors by the eye. Extremely high technical complexity is required in order to ensure the desired function.

SUMMARY OF THE INVENTION

Thus, the object of the invention consists of providing an arrangement with an adaptive spectacle lens, which has a comparatively simple design but takes into account the sensitivity of the visual power with respect to different ambient conditions, more particularly with respect to the ambient illumination and the contrast. A further object of the invention consists of providing a comparatively simple method for setting an adaptive spectacle lens, which takes into account the sensitivity of the visual power with respect to different ambient conditions, more particularly with respect to the ambient illumination and the contrast.

The arrangement of the invention includes: a spectacle lens with changeable optical effect; an effect-setting apparatus for setting the optical effect of the spectacle lens based on intended-setting data; a memory apparatus for storing first intended-setting data for adjusting a first predetermined optical intended effect; the first predetermined optical intended effect being determined from a first refraction measurement on an eye of a spectacle wearer for whom the spectacle lens is specified; the memory apparatus further being for storing second intended-setting data for adjusting a second predetermined optical intended effect; the second predetermined optical intended effect being determined from a second refraction measurement on the eye; and, a supply apparatus for supplying the first intended-setting data or the second intended-setting data to the effect-setting apparatus.

The arrangement according to the invention comprises a spectacle lens having a changeable optical effect, and an effect-setting apparatus in order to set the optical effect of the spectacle lens to a prescribed optical intended effect on the basis of intended-setting data. A spectacle lens having a changeable optical effect can for example be embodied in the form of one of the electro-optical lenses described in WO 2008/027890 A2 or WO 2008/033290 A2 or United States patent application publication 2007/0280626 A1 or United States patent application publication 2007/0290972 A1 or United States patent application publication 2008/0180630

A1. In general, provision is made for a two-dimensional structure, the optical properties of which can be changed locally with the aid of electrodes that are arranged in the form of a switching matrix. The effect-setting apparatus may for example be embodied as a voltage sensor, as described in United States patent application publication 2008/0180630 A1, in order, for example, to apply different voltages to the electrodes arranged in the form of a switching matrix.

Furthermore, according to the invention, provision is made for a memory apparatus for storing at least two different items of intended-setting data for different optical intended effects. Optical intended-setting data should be understood to mean optionally coded variables, on the basis of which the effect-setting apparatus is able to set the desired intended effects. The first optical intended effect, which is stored in the memory apparatus in the form of intended-setting data, was established earlier from a first refraction measurement on an eye of a spectacles wearer for whom the spectacle lens is destined. The second optical intended effect, which was likewise stored in the memory apparatus in the form of intended-setting data, was established earlier from a second refraction measurement on the eye of the spectacles wearer for whom the spectacle lens having a changeable optical effect is destined.

The arrangement according to the invention furthermore comprises a supply apparatus for supplying the intended-setting data stored in the memory apparatus, more particularly for supplying the first intended-setting data or the second intended-setting data, to the effect-setting apparatus. Thus, the supply apparatus constitutes a type of data line serving for transferring the desired intended-setting data to the effect-setting apparatus which, in turn, for example provides the electrode signals required for setting the desired optical intended effect.

The method according to the invention for setting the optical effect of a spectacle lens having a changeable optical effect on the basis of intended-setting data is correspondingly characterized in that, firstly, a first refraction measurement is carried out on the eye of the spectacles wearer for whom the spectacle lens is destined. By way of example, the refraction measurement can be carried out by an ophthalmologist, or else by an optician. It may be an objective refraction measurement that is measured by means of an apparatus arrangement and determined by the refractive properties of the eyeball, or it may be a subjective refraction measurement that demands information from the examinee about the perceived image sharpness and takes into account the influence of further variables on the perception. It is also possible that the refraction measurement contains information from both an objective and a subjective refraction measurement. It goes without saying that, more particularly, the refraction measurement can be determined from a plurality of refraction measurements by means of, inter alia, a weighted average as well. A first optical intended effect of the spectacle lens is then determined on the basis of the first refraction measurement. The associated setting data on the basis of which the first optical intended effect can be set in the spectacle lens is then stored as first intended-setting data.

A second refraction measurement is then carried out on the eye of the spectacles wearer for whom the spectacle lens is destined. The second refraction measurement, which, like the first refraction measurement, can be carried out in very different ways; is then used to determine a second optical intended effect of the spectacle lens, which deviates from the first optical intended effect. The associated setting data on the basis of which the second optical intended effect can be set in the spectacle lens is then stored as second intended-setting data. Further optical intended effects established on the basis of refraction measurements can accordingly be stored in the form of corresponding intended-setting data.

According to the invention, the optical effect of the spectacle lens is then set on the basis of the first intended-setting data and/or the second intended-setting data and/or the optional further stored intended-setting data.

The first optical intended effect, which is stored in the memory apparatus in the arrangement according to the invention or which is stored according to the method according to the invention, can be an optical effect, serving to correct the refractive error of the eye, which was established on the eye in a refraction measurement carried out under a first ambient illumination condition, and the second optical (and optionally one or more further) intended effect(s) can be one (or more) optical effect(s), serving for correction purposes, which was (were) established on the eye in one (or more) refraction measurement(s) carried out under a second (or further) ambient illumination condition that deviates from the first ambient illumination condition. Ambient illumination conditions should be understood to mean illumination conditions that prevail in the surroundings of the subject when the refraction measurement is carried out and influence the visual power. The illumination spectrum can also play a role in addition to the ambient brightness and/or as an alternative to the ambient brightness.

It is known that the best correction of a refractive error of the eye changes depending on the respective conditions under which the seeing take place. Moreover, these changes are very different from person to person. Hence it is possible that the stored intended effects, or the intended effects stored in the memory apparatus in the form of intended-setting data serving to correct the refractive error of the eye, are optimized in respect of the respective ambient illumination conditions. In other words, the corrective effect of the spectacle lens can also be taken into account even in the case of the intended effects stored in the form of intended-setting data.

The first optical intended effect can also be an effect which was established on the eye in a refraction measurement carried out under a first contrast condition and the second (or optionally further) optical intended effect(s) can be an effect (or further effects) which was (were) established on the eye in one (or more) refraction measurement(s) carried out under a second (or further) contrast condition(s) that deviate(s) from the first contrast condition. The contrast condition is understood to be the pair of values of spatial frequency and contrast in FIG. 2 in U.S. Pat. No. 7,771,052, already mentioned in the introduction of the description, that is, the coordinates of a point in this diagram. The respectively established intended effects are preferably those in which the contrast sensitivity at a particular spatial frequency is highest.

The best correction of a refractive error of the eye required for a respective person also changes depending on the respective contrast conditions under which seeing takes place. These conditions are very different from person to person. The individual contrast sensitivity can be established by various methods, for example the so-called Ginsburg test or the method described in U.S. Pat. No. 7,771,052. The influence of different spectacle glass prescriptions on the contrast vision can also be established by these tests. Thus, for each spatial frequency (specified in cycles per degree, cpd), it is possible to establish the optical effect of a spectacle lens, that is, for example corresponding spherical, cylindrical and axis values, that maximizes the contrast sensitivity of the eye at this cpd value.

The arrangement according to the invention can have a switching apparatus for switching the supply apparatus between supplying the first intended-setting data stored in the memory apparatus and supplying the second intended-setting data stored in the memory apparatus and optionally supplying further intended-setting data stored in the memory apparatus. Switching may be performed manually or automatically. Switching between different optical effects established previously by refraction measurements allows the corrective effect of the spectacle lens to be brought in line with different ambient conditions. Thus, for example, it is possible to switch between daytime refraction and nighttime refraction. Spectacles with corresponding spectacle glasses allow the wearer to have optimal vision during daylight conditions and in low-level lighting or darkness. The currently prevalent compromise on the basis of assuming a "mean pupil radius" when calculating the ordered values (prescription) for the spectacles can thus be consigned to history.

It is expedient if the illumination conditions are determined in the surroundings of the person wearing spectacles with the spectacle lens equipped, according to the invention, with additional components and if the optical effect of the spectacle lens is switched between the first optical intended effect and the second optical intended effect (or optionally further optical intended effects, in particular previously established and stored intended-setting data or else intended-setting data interpolated by computation from the stored intended-setting data), depending on the respective currently determined ambient illumination. Continuous setting is also possible if there is a sufficient amount of different stored intended-setting data and/or intended-setting data obtained by computational interpolation.

To this end, the arrangement according to the invention can have an ambient illumination sensor for determining a measure of the illumination conditions in the surroundings of the person wearing the spectacles lens and an ambient illumination control apparatus for actuating the switching apparatus depending on the measure for the illumination conditions, determined by the ambient illumination sensor, in the surroundings of the person wearing the spectacle lens. The ambient illumination sensor may for example be embodied to determine the respectively prevalent luminance. By way of example, if said luminance is below a predetermined luminance, the ambient illumination control apparatus can then send a control signal to the switching apparatus which, via the supply apparatus, actuates the effect-setting apparatus with the intended-setting data for nighttime refraction. If the luminance determined by the ambient illumination sensor exceeds a specific threshold, which may under certain circumstances also deviate from the previously specified threshold for switching to nighttime refraction, the ambient illumination control apparatus can then for example send a control signal to the switching apparatus which, via the supply apparatus, actuates the effect-setting apparatus with the intended-setting data for daytime refraction. Provided that further intended-setting values are stored in the memory apparatus there may also, if corresponding further thresholds are undershot or overshot, be a switch to the corresponding intended effects, established from further refractions, which intended effects were obtained at different values of the luminance. This affords the possibility of calculating and setting the fitting effect for the two spectacle glasses for the currently prevalent illumination situation.

It was furthermore found to be advantageous if the spatial frequency space of the observed surroundings of the person wearing the spectacle lens is determined and the optical effect of the spectacles lens is switched between the first optical intended effect and the second optical intended effect (and optionally further intended effects) depending on the prevalent spatial frequency. In order to determine the spatial frequency space, the conventional methods from image processing (Fourier analysis, Fourier transform) may be used.

The arrangement according to the invention can, for the purpose specified above, have an ambient contrast determination apparatus for determining a measure for a contrast ratio in surroundings of the person wearing the spectacle lens and a contrast-ratio control apparatus for actuating the switching apparatus depending on the determined measure for the contrast ratio in the surroundings of the person wearing the spectacle lens. By way of example, a recording instrument, such as, for example, an electronic camera, and an image evaluation system connected thereto, can be provided as ambient contrast determination apparatus, which determines the spatial-frequency range of the observed object region (at least in the general direction of the spectacles). The switching apparatus then, analogously to the control above in respect of the illumination, ensures the switch to the best-fitting effect of the spectacle glasses for this spatial-frequency range.

What is obtained are spectacles with spectacle glasses, the corrective effect of which is set automatically depending on the visual conditions in the surroundings. The prevalent spatial frequency of the observed object region (at least in the general direction of the spectacles) is determined with the aid of a suitable recording instrument (for example, an electronic camera) attached to the spectacles and an image evaluation system attached thereto and the best-fitting effect of the spectacle glasses for this is set.

BRIEF DESCRIPTION OF THE DRAWINGS

The invention will now be described with reference to the drawings wherein:

FIG. 4 shows a flowchart of a first exemplary embodiment for a method according to the invention.

DESCRIPTION OF THE PREFERRED
EMBODIMENTS OF THE INVENTION

Figure 1:
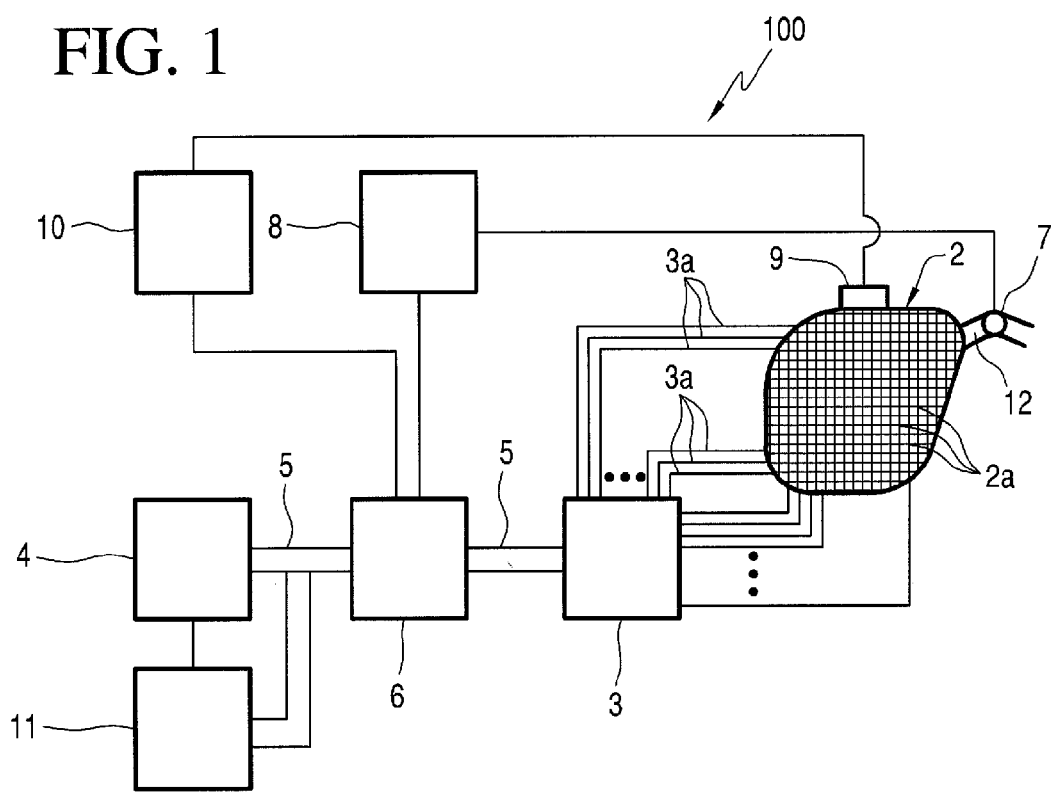
FIG. 1 shows a first exemplary embodiment of an arrangement according to the invention.
Figure 2:
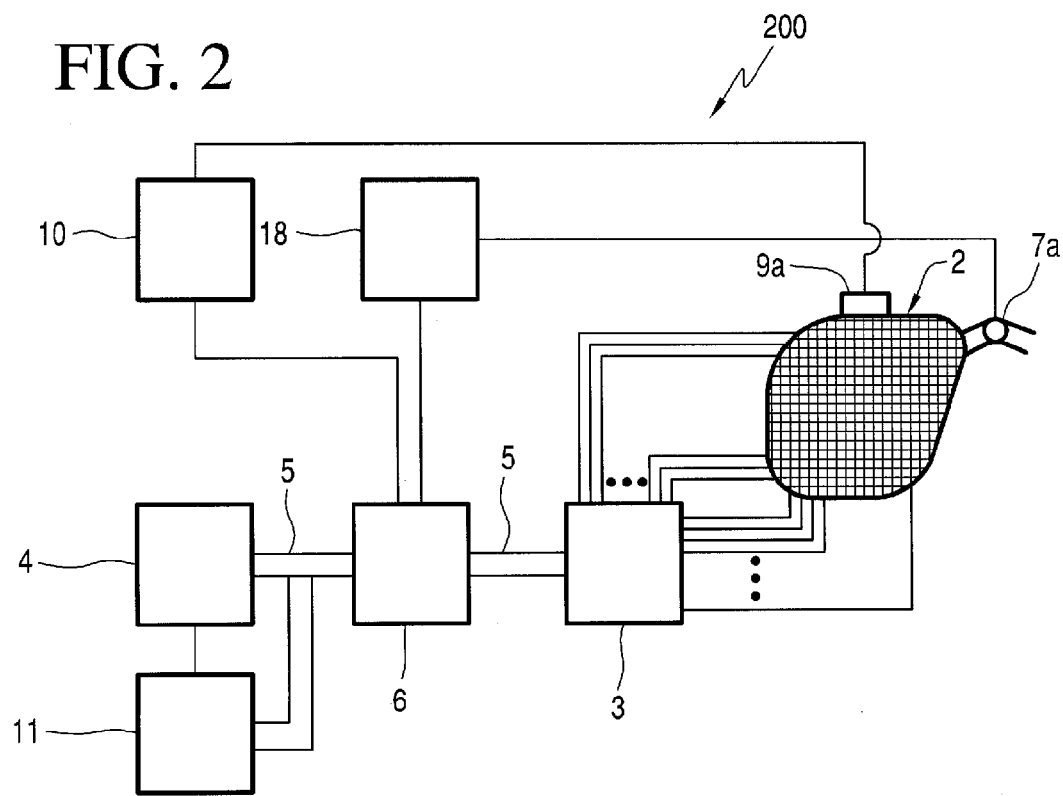
FIG. 2 shows a second exemplary embodiment of the arrangement according to the invention.

FIG. 1 shows a schematic of a first exemplary embodiment of an arrangement 100 according to the invention. The arrangement 100 comprises a spectacle lens 2 having a changeable optical effect. In the exemplary embodiment, the spectacle lens 2 has electrodes 2a, arranged like a matrix, which make it possible to change the optical properties of the spectacle lens 2 locally with the aid of electric signals.

These electric signals, preferably voltage signals, for the electrodes 2a are provided by an effect-setting apparatus 3. The effect-setting apparatus 3 therefore has a multiplicity of (voltage) signal outputs, which are connected to the corresponding electrodes 2a via control lines 3a. The effect-setting apparatus 3 furthermore has a plurality of signal inputs in order to supply information (referred to here as intended-setting data) to the effect-setting apparatus 3 relating to how the electrodes 2a have to be actuated via the control lines 3a in order to obtain a desired optical effect distribution (referred to here as optical intended effect for simplicity) over the lens surface.

The arrangement 100 shown in FIG. 1 furthermore comprises a memory apparatus 4 for storing intended-setting data.

According to the invention, provision is made for at least two items of intended-setting data to be stored in the memory apparatus 4. In an exemplary fashion, these are the intended-setting data for setting the optical effect of the spectacle lens 2 such that the corrective effect thereof selectively compensates for precisely the refractive error of the subject in normal daylight vision (first intended-setting data) or in low-level lighting vision (second intended-setting data). More intended-setting data may be stored in the memory apparatus, for example data that brings about a corrective effect matched to different contrast ratios.

The memory apparatus 4 is connected to the effect-setting apparatus 3 via a supply apparatus, a data line 5 in the present exemplary embodiment, in order to be able to supply the first intended-setting data or the second intended-setting data to the effect-setting apparatus 3.

A switching apparatus 6 is inserted into the supply apparatus 5. The switching apparatus 6 serves to supply either the first or the second intended-setting data to the effect-setting apparatus 3, which then in turn generates control signals for the electrodes 2a in order to set the desired optical effect of the spectacle lens 2.

The arrangement 100 illustrated in FIG. 1 furthermore comprises a brightness sensor 7. This brightness sensor 7 can, as sketched in FIG. 1, be attached to the nose bridge 12. The brightness sensor 7 determines the currently prevalent luminance. Hence, it serves for determining a measure for the illumination conditions in the surroundings of the person (not illustrated) wearing the spectacle lens 2. A sensor recording the illumination spectrum may also be provided instead of a brightness sensor 7, or provision may be made of both. Furthermore, an ambient illumination control apparatus 8 is provided and connected to the brightness sensor 7 on the input end and to the switching apparatus 6 on the output end. This ambient illumination control apparatus 8 serves to actuate the switching apparatus 6 depending on the determined measure for the illumination conditions in the surroundings of the person wearing the spectacle lens 2. In other words, the ambient illumination control apparatus 8 triggers the switching apparatus 6 to switch between the first and second intended-setting data, depending on whether the luminance detected by the brightness sensor 7 has exceeded a certain threshold or has dropped below an optionally deviating threshold.

The arrangement 100 optionally furthermore comprises an electronic camera 9 with an integrated image evaluation system. The camera 9 records structures arranged in the object region in front of the spectacles. By applying image processing (Fourier analysis, Fourier transform), the image evaluation system is able to use the images recorded by the camera 9 to determine the distribution of the spatial frequencies in the surroundings that are observed by the person wearing the spectacle lens 2.

The camera 9 or, more precisely, the image evaluation system of the camera 9 is connected to a contrast-ratio control apparatus 10 via a conducting connection. On the output end, the contrast-ratio control apparatus 10 is connected to the control input of the switching apparatus 6. The contrast-ratio control apparatus 10 serves for actuating the switching apparatus 6 depending on the prevalent spatial frequencies in the surroundings of the person wearing the spectacle lens 2. To the extent that corresponding intended-setting data is stored in the memory apparatus 4, the contrast-ratio control apparatus 10 can trigger the switching apparatus 6 to switch between further intended-setting data, depending on which spatial frequency is prevalent in the observed surroundings.

The arrangement 100 illustrated in FIG. 1 finally also comprises a computation apparatus 11 for calculating further intended-setting data from the intended-setting data stored in the memory apparatus 4. Thus, for example, suitable interpolation methods may be used to calculate suitable or optimized corrective effects of the spectacle glass 2 for further brightness levels and/or spatial frequencies. The switching apparatus 6 can then, controlled by the corresponding apparatuses (8, 10), switch to the respectively most suitable intended-setting data on the basis of the ambient conditions captured by the sensors (7, 9). The supply apparatus 5 ensures that the intended-setting data is transmitted to the effect-setting apparatus 3, which in turn ensures then that the voltage signals required to produce the desired optical effect are applied to the electrodes 2a.

For completeness' sake it is noted that the components of the arrangement 100 according to the invention, which are illustrated as in a block diagram, and also the connection lines thereof, may for example be arranged in a spectacle frame, more particularly in the earpieces of the corresponding spectacles. The components may be provided separately for each spectacle glass or may be provided together for both spectacle glasses.

FIG. 4 shows a flowchart 400 of a first exemplary embodiment of a method according to the invention for using intended-setting data to set the optical effect of a spectacle lens having a changeable optical effect. The method starts with (step 401), in a first step, a first refraction measurement being carried out on a human eye under predetermined ambient conditions; this is used to derive a first optical intended effect for the spectacle lens and the corresponding first intended-setting data for the spectacle lens is stored (step 402).

Figure 3:
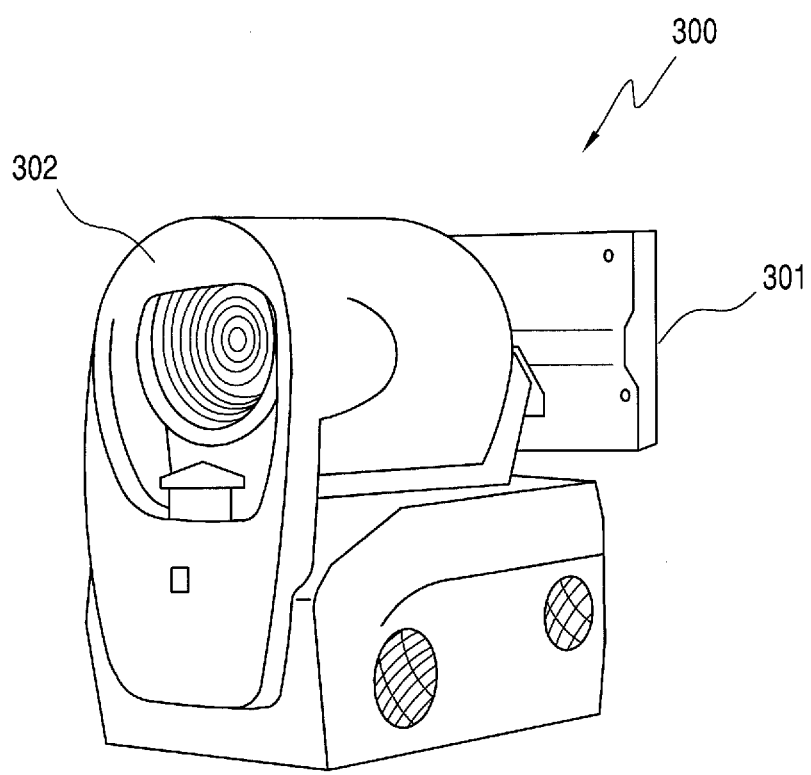
FIG. 3 shows an autorefractor according to the prior art.

By way of example, the refraction measurement may be carried out using the autorefractor 300 illustrated in FIG. 3, which is distributed by Carl Zeiss Vision GmbH, Aalen, Germany, under the brand name iProfiler. This instrument 300 comprises a wavefront sensor, which operates according to the Hartmann-Shack method. It is possible to prescribe very precisely the conditions under which the refraction measurement is carried out. In particular, it is possible to set precisely the ambient illumination and the prevalent spatial frequency. Thus it is possible to determine the prescribed spectacle-glass effect such that the contrast sensitivity is maximized for a specific viewing object or viewing situation. As a result of the refraction measurement by the examiner, namely an optician or optionally an ophthalmologist, spherical, cylindrical and axis values are obtained. The optical intended effect established like this for the spectacle lens 2 under the aforementioned conditions can be set, for example, by a suitable selection of electric signals at the electrodes 2a of the above-described spectacle glass 2. The associated intended-setting data is now established by calculation and it is used by, for example, the effect-setting apparatus 3 illustrated in FIG. 1 in order to generate the corresponding electric signals. By way of example, this intended-setting data is stored in the memory apparatus 4 illustrated in FIG. 1.

In a second step 403, a second refraction measurement is carried out on the human eye under different ambient conditions. Thus, for example, the prevalent spatial frequency may be changed and/or the brightness and/or even the illumination spectrum may be changed, during which the refraction measurement is carried out. A further optical intended effect is also derived for the spectacle lens from this refraction measurement following the above-described prescription, and the corresponding further intended-setting data for the spectacle lens is stored. This procedure may be repeated under deviating ambient conditions, optionally until the storage capacity of the memory apparatus is exhausted (steps 404, 403).

This procedure may be carried out separately for each eye and the corresponding information can be stored in the same memory apparatus or in different memory apparatuses.

While the spectacles are worn, the ambient conditions are continuously measured in the surroundings of the spectacles wearer, for example by means of the sensors (7, 9) illustrated in FIG. 1. Thus, it is possible to measure, for example, the ambient illumination and/or the prevalent spatial frequency (cf. step 405). The optical effect of the spectacle lens is then set by means of intended-setting data, for example stored in the memory apparatus 4 according to FIG. 1, and depending on the measurement values (step 407), after the optimum intended effect was previously determined taking into account the measured ambient conditions and more particularly the ambient illumination and/or the prevalent spatial frequency (step 406). This results in spectacles with an optical effect that, in the ideal case, is always in line with the current requirements (step 408).

It is understood that the foregoing description is that of the preferred embodiments of the invention and that various changes and modifications may be made thereto without departing from the spirit and scope of the invention as defined in the appended claims.

What is claimed is:

1. An arrangement comprising:
    a spectacle lens with changeable optical effect;
    an effect-setting apparatus for setting the optical effect of said spectacle lens based on intended-setting data;
    a memory apparatus for storing first intended-setting data for adjusting a first predetermined optical intended effect;
    said first predetermined optical intended effect being determined from a first refraction measurement on an eye of a spectacle wearer for whom said spectacle lens is specified;
    said memory apparatus further being for storing second intended-setting data for adjusting a second predetermined optical intended effect;
    said second predetermined optical intended effect being determined from a second refraction measurement on said eye; and,
    a supply apparatus for supplying said first intended-setting data or said second intended-setting data to said effect-setting apparatus;
    wherein said first optical intended effect is an effect determined from a refraction measurement on said eye carried out under a first contrast condition and said second optical intended effect is an effect determined from a refraction measurement on said eye carried out under a second contrast condition departing from said first contrast condition.

2. The arrangement of claim 1, wherein said first optical intended effect is an optical effect determined from a refraction measurement on said eye carried out under a first ambient illumination condition and said second optical intended effect is an optical effect determined from refraction measurement on said eye carried out under a second ambient illumination condition departing from said first ambient illumination condition.

3. The arrangement of claim 1, further comprising a switching apparatus for switching over said supply apparatus between the supply of said first intended-setting data and the supply of said second intended-setting data.

4. The arrangement of claim 3, further comprising:
    an ambient illumination sensor for determining a measure for an illumination ratio in an ambient of the person wearing said spectacle lens; and, an ambient illumination control apparatus for driving said switching apparatus in dependence upon said measure for said illumination in the ambient of the person wearing said spectacle lens.

5. The arrangement of claim 4, further comprising an ambient contrast determination device for determining a measure for a contrast ratio in an ambient of the person wearing said spectacle lens; and, a contrast-ratio control apparatus for driving said switching apparatus in dependence upon the determined measure for the contrast ratio in the ambient of the person wearing said spectacle lens.

6. The arrangement of claim 5, further comprising: a computing apparatus for computing additional intended-setting data for adjusting at least one additional optical intended effect from said first intended-setting data and/or from said first predetermined optical intended effect and/or from said second intended-setting data and/or from said second predetermined optical intended effect; said supply apparatus being configured for supplying of the additional intended-setting data to said effect-setting apparatus; and, said switching apparatus being configured to switch over said supply apparatus between the supply of said first intended-setting data and the supply of said second intended-setting data and the supply of said additional intended-setting data.

7. A method for setting the optical effect of a spectacle lens having a changeable optical effect based on intended-setting data, the method comprising the steps of:
    storing first intended-setting data for setting a first optical intended effect predetermined by a first refraction measurement on an eye of the spectacle wearer;
    storing a second intended-setting data for setting a second optical intended effect predetermined by a second refraction measurement on said eye;
    setting the optical effect of said spectacle lens based on said first intended-setting data and/or said second intended-setting data; and,
    determining said first optical intended effect from a refraction measurement on said eye carried out under a first contrast condition; and, determining said second optical intended effect from a second contrast condition departing from said first contrast condition.

8. The method of claim 7, comprising the further steps of determining said first optical intended effect from a refraction measurement on said eye carried out under a first ambient illumination condition; and, determining said second optical intended effect from a refraction measurement carried out under a second ambient illumination condition departing from said first ambient illumination condition.

9. The method of claim 8, comprising the further step of switching over said optical effect of said spectacle lens between said first optical intended effect and said second optical intended effect.

10. The method of claim 9, comprising the further steps of determining an ambient illumination in an ambient of the person wearing said spectacle lens; and, switching over said optical effect of said spectacle lens between said first optical intended effect and said second optical intended effect in dependence upon the specific ambient illumination.

11. The method of claim 10, comprising the further steps of: determining an ambient contrast in an ambient of the person wearing said spectacle lens; and, switching over said optical effect of said spectacle lens between said first optical intended effect and said second optical intended effect in dependence upon the specific ambient contrast.

12. The method of claim 11, comprising the further steps of: computing additional intended-setting data for setting at least one additional optical intended effect from said first intended-setting data and/or from said first predetermined optical intended effect and/or from said second intended-setting data and/or from said second predetermined optical intended effect; and, setting the optical effect of said spectacle lens additionally based on said additional intended-setting data.

\* \* \* \* \*

UNITED STATES PATENT AND TRADEMARK OFFICE
CERTIFICATE OF CORRECTION

PATENT NO. : 8,851,677 B2
APPLICATION NO. : 13/331559
DATED : October 7, 2014
INVENTOR(S) : Liebich et al.

It is certified that error appears in the above-identified patent and that said Letters Patent is hereby corrected as shown below:

In the Specification

Column 1:
Line 10: delete "10  2010  05.6," and insert -- 10  2010  055  185.6, -- therefor.

Column 6:
Line 55: delete "2$a$are" and insert -- 2$a$ are -- therefor.
Line 58: delete "2$a$via" and insert -- 2$a$ via -- therefor.
Line 62: delete "2$a$have" and insert -- 2$a$ have -- therefor.
Line 62: delete "3$a$in" and insert -- 3$a$ in -- therefor.

Signed and Sealed this
Thirty-first Day of March, 2015

Michelle K. Lee
*Director of the United States Patent and Trademark Office*